United States Patent Office 3,075,970
Patented Jan. 29, 1963

3,075,970
NOVEL ETHYNYLATED ANALOGS OF
ESTRADIOL AND PROCESS
Gérard Nominé, Noisy-le-Sec, Robert Bucourt, Villiers-le-Bel, and Candido Snozzi, Neuilly, France, assignors, by mesne assignments, to Roussel-UCLAF, S.A., Paris, France, a corporation of France
No Drawing. Filed Dec. 7, 1961, Ser. No. 157,815
Claims priority, application France Dec. 14, 1960
7 Claims. (Cl. 260—239.55)

This invention relates to novel 17α-ethynylated analogs of estradiol having the formula

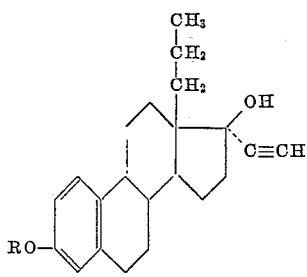

(I)

wherein R is selected from the group consisting of hydrogen, alkyl having 1 to 18 carbon atoms and an acyl radical of an organic carboxylic acid having 1 to 18 carbon atoms. The invention also relates to a novel process for the preparation of compounds of Formula I and novel intermediates therefor. The compounds of Formula I have useful physiological properties and exercise, in particular, a considerable oral estragenic action.

It is an object of the invention to obtain the novel 17α-ethynylated estradiol analogs of Formula I.

It is another object of the invention to provide a novel process for the preparation of novel 17α-ethynylated estradiol analogs of Formula I.

It is an additional object of the invention to obtain novel intermediates for the preparation of novel 17α-ethynylated estradiol analogs of Formula I and particularly:

(a) 18-nor-13β-n-propyl-estrone
(b) 3 - (tetrahydropyranyl - 2') - oxy - 13β - n - propyl-$\Delta^{1,3,5(10)}$-gonatriene-17-one
(c) 3 - (tetrahydropyranyl - 2') - oxy - 17α - ethynyl-13β-n-propyl-$\Delta^{1,3,5(10)}$-gonatriene-17β-ol These and other objects and advantages of the invention will become obvious from the following detailed description.

The novel 17α-ethynylated estradiol analogs of the invention have the formula

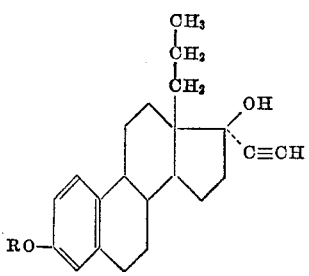

wherein R is selected from the group consisting of hydrogen, alkyl having 1 to 18 carbon atoms and an acyl radical of an organic carboxylic acid having 1 to 18 carbon atoms.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as benzoic acid and 2,4-dinitrobenzoic acid; phenoxy alkanoic acids such as phenoxy acetic acid, p-chlorophenoxy acetic acid, 2,4-dichlorophenoxy acetic acid, 4-ter-butyl-phenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid.

The process for the preparation of the compounds of Formula I comprises selectively oxidizing 18-nor-13β-n-propyl-estradiol in the 17-position with an aluminum alcoholate, preferably an aluminum lower alkanolate such as aluminum isopropylate by the Oppenauer reaction to form 18-nor-13β-n-propyl-estrone, reacting the latter with dihydropyran under acidic conditions to form 3-(tetrahydro-pyranyl-2') - oxy-13β-n-propyl-$\Delta^{1,3,5(10)}$ - gonatriene - 17-one, reacting the latter with an ethynyl magnesium halide to form 3 - (tetrahydropyranyl-2') - oxy - 17α - ethynyl-13β-n-propyl-$\Delta^{1,3,5(10)}$-gonatriene - 17β - ol, hydrolyzing the latter under acidic conditions to form 17α-ethynyl-18-nor-13β-n-propyl-estradiol and recovering a compound of Formula I. The process is illustrated by the reaction in Table I.

TABLE I

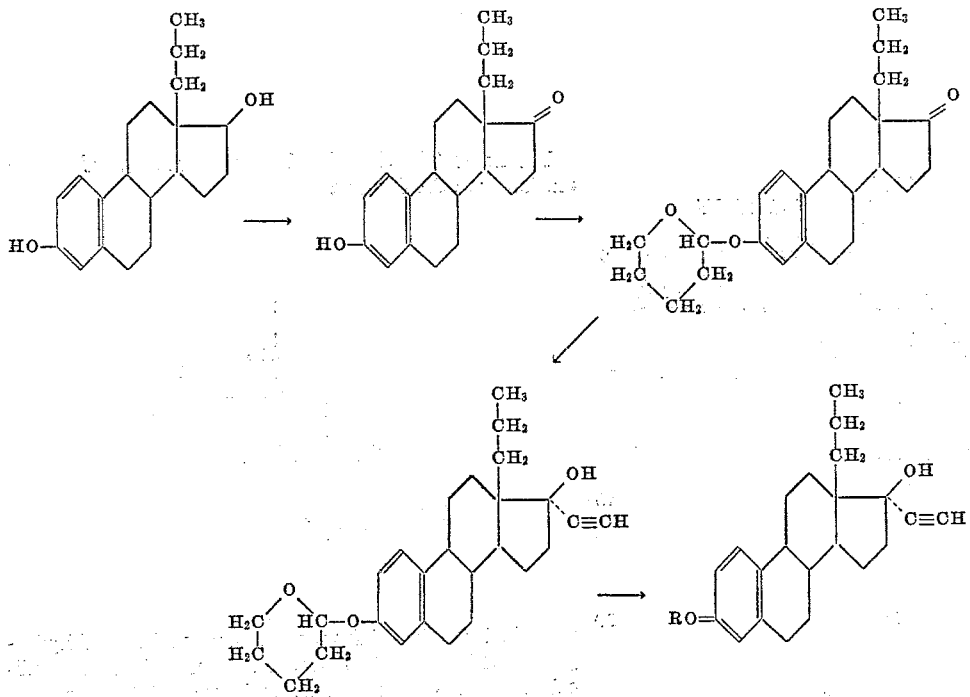

wherein R has the above definition.

By the term "gonane" and its derivatives we mean a fully saturated cyclopentanophenanthrene having the normal spatial configuration of a steroid. The molecule can also be termed an 18,19-bisnor-androstane.

A preferred mode of the process of the invention comprises oxidizing 18-nor-13β-n-propyl-estradiol with an aluminum lower alkanoate such as aluminum isopropylate in the presence of a ketone, preferably cyclohexanone to form 18-nor-13β-n-propyl-estrone, reacting the latter with dihydropyran in the presence of phosphoric acid to form 3 - (tetrahydropyranyl - 2') - oxy - 13β - n - propyl-$\Delta^{1,3,5(10)}$-gonatriene-17-one, reacting the latter with ethynyl magnesium bromide to form 3-(tetrahydropyranyl-2')-oxy - 17α - ethynyl - 13β - n - propyl - $\Delta^{1,3,5(10)}$ - gonatriene-17β-ol, hydrolyzing the latter with p-toluene sulfonic acid in a lower alkanol to form 17α-ethynyl-18-nor-13β-n-propyl-estradiol and recovering a compound of Formula I.

The starting material, 18-nor-13β-n-propyl-estradiol, is obtained according to the process described in the commonly assigned, copending U.S. patent application Serial No. 96,061, filed on January 19, 1961, now abandoned. The process comprises cyclizing 13β-n-propyl-17β-benzoyloxy-4,5-seco-$\Delta^9$-gonene-3,5-dione under alkaline conditions to form 13β-n-propyl-17β-benzoyloxy-$\Delta^{4,9}$-gonadiene-3-one, isomerizing the latter to the benzoate ester of 18-nor-13β-n-propyl-estradiol and saponifying the latter to obtain 18-nor-13β-n-propyl-estradiol. The 13β-n-propyl-17β-benzoyloxy-4,5-seco-$\Delta^9$-gonene-3,5-dione is prepared by reacting 6-methoxy-3,4-dihydronaphthyl-(2,1)-isooxazole with an allyl halide under alkaline conditions to form 2-allyl-2-cyano-6-methoxy-tetralone-1, hydrogenating the latter and condensing the resulting product with dimethyl succinate under alkaline conditions to form 5-methoxy - 13β - n - propyl - 15 - carbomethoxy - $\Delta^{5,7,9,14}$-des A-gonatetraene-17-one, reducing the latter to form 5-methoxy - 13β - n - propyl - 15 - carboxy - $\Delta^{5,7,9,14}$-gonatetraene-17β-ol, resolving the latter to obtain the levorotatory enantiomorph, decarboxylating the latter to form 5-methoxy-13β-n-propyl-$\Delta^{5,7,9,14}$-des A-gonatetraene-17β-ol, catalytically hydrogenating the latter to form 5-methoxy-13β-n-propyl-$\Delta^{5,7,9}$-des A-gonatriene-17β-ol, reducing the latter with an alkali metal in ammonia to form 13β-n-propyl-$\Delta^9$-des A-gonene-17β-ol-5-one, esterifying the latter with an acylating agent of benzoic acid and reacting the ester with pyrrolidine to form 5-pyrrolidyl-13β-n-propyl-17β-benzoyloxy-des A-$\Delta^{5(10),9(11)}$-gonadiene, condensing the latter with a 1,3-dihalo-2-butene to form 3-halo - 13β - n - propyl - 17β - benzoyloxy - 4,5 - seco-$\Delta^{2,9}$-gonadiene and hydrolyzing the latter under acid conditions to form 13β-n-propyl-17β-benzoyloxy-4,5-seco-$\Delta^9$-gonene-3,5-dione.

In the following example there are described several preferred embodiments to illustrate the invention. However, it should be understood that the invention is not intended to be limited to the specific embodiments.

EXAMPLE

*Preparation of 17α-Ethynyl-18-Nor-13β-n-Propyl Estradiol*

Step 1—*Oxidation.*—81 mg. of 18-nor-13β-n-propyl-estradiol (obtained by the process described in United State patent application No. 96,061 of January 19, 1961), were dissolved in 3.5 cc. of anhydrous toluene. The mixture was heated to reflux and 0.75 cc. of cyclohexanone and 31 mg. of aluminum isopropylate in 2 cc. of anhydrous toluene were added over a period of one hour. The heating was continued for about ten minutes. After cooling, 4 cc. of methylene chloride were added. The organic phase was washed with N sulfuric acid, with N sodium hydroxide and with water until the wash waters were neutral. On concentration to dryness under vacuum, 85.7 mg. of a product were obtained, consisting of raw 18-nor-13β-n-propyl-estrone.

The product was purified by chromatography over silica gel and elution with methylene chloride containing 40% carbon tetrachloride. A yield of 62 mg. (being 73%) of the pure product melting at 187° C. was obtained. This product occurred in the form of white crystals, soluble in alcohol, acetone and chloroform, slightly soluble in ether and insoluble in water.

This product is not described in the literature.

Step 2—*Preparation of an ether in the 3-position.*—200 mg. of 18-nor-13β-n-propyl-estrone were introduced into 0.8 cc. of dihydropyran containing 0.02 cc. of 75% concentrated phosphoric acid. The mixture was agitated and then allowed to stand in a closed vessel for a period of 17 hours at room temperature. Next, 10 cc. of ether were added thereto and the ethereal phase was washed with 1 N sodium hydroxide, then with water and the ethereal solution was evaporated to dryness in a vacuum. The residue was taken up in 0.7 cc. of hexane at 0° C. 191 mg. of 3-(tetrahydropyranyl-2')-oxy-13β-n-propyl-Δ$^{1,3,5(10)}$-gonatriene-17-one having a melting point of 130° C. were obtained.

The product occurred in the form of white crystals and was soluble in benzene, chloroform, alcohol, ether, acetone, and insoluble in water.

This compound is not described in the literature.

*Step 3—Ethynylation.*—A stream of methyl bromide was made to bubble into a suspension of 1.5 gm. of magnesium in 24 cc. of anhydrous ether under agitation. The reaction was initiated by a slow heating. Then the reaction was continued at the refluxing temperature of the ether. To the magnesium solution thus obtained, 10 cc. of anhydrous ether and 60 cc. of tetrahydrofuran were added while cooling. Then acetylene was made to bubble therethrough for a period of three hours.

A solution of ethynyl magnesium bromide was obtained to which 184 mg. of 3-(tetrahydropyranyl-2')-oxy-13β-n-propyl-Δ$^{1,3,5(10)}$-gonatriene-17-one in 15 cc. of tetrahydrofuran were added and the mixture was heated to reflux for a period of two and a half hours. After cooling, 40 cc. of a saturated solution of ammonium chloride were added; then water was added. The liquid phase was decanted and the aqueous phase was extracted with ether. The organic phases were combined and evaporated to dryness under vacuum. The residue, dissolved in benzene, was subjected to chromatography over silica gel and eluted with methylene chloride containing 0.2% of acetone.

174.2 mg. of 3-(tetrahydropyranyl-2')-oxy-17α-ethynyl-13β-n-propyl-Δ$^{1,3,5(10)}$-gonatriene-17β-ol were recovered which new product was utilized without further purification for the next step of the synthesis.

This product is not described in the literature.

*Step 4—Hydrolysis of the ether in the 3-position.*—The 174.2 mg. of the product obtained in step 3 were dissolved in 1.8 cc. of ethanol. 9 mg. of p-toluene sulfonic acid were added and the mixture was heated to reflux under an atmosphere of nitrogen for a period of 25 minutes. Then, 20 cc. of ether were added and the mixture was washed with a saturated aqueous solution of sodium bicarbonate and evaporated to dryness under vacuum.

The residue, dissolved in benzene, was subjected to chromatography over magnesium silicate and eluted with methylene chloride. The solution obtained by elution was concentrated to 5 cc. and was extracted with a mixture of N sodium hydroxide and ethanol (1:1). The aqueous phase was reduced to a small volume and hydrochloric acid was added until the pH was 1. A precipitate was obtained which was washed with water and dried. It weighed 79.5 mg. and represented a yield of 65.5%. After crystallization from methanol, 49 mg. of 17α-ethynyl-18-nor-13β-n-propyl-estradiol were obtained, being a yield of 40.5%. The product had a melting point of 102–103° C. and a specific rotation $[\alpha]_D^{20} = -19° \pm 1°$ (c.=0.45% in ethanol).

Ultraviolet spectra in ethanol:

$\lambda_{max.}$ at 281 mμ $E_{1\,cm.}^{1\%} = 56.6$, $\epsilon = 1840$ $\lambda_{inflexion}$ at 230 mμ $E_{1\,cm.}^{1\%} = 138$ at 285.5 mμ $E_{1\,cm.}^{1\%} = 51.3$, $\epsilon = 1660$ From the mother liquors of crystallization a second yield which weighed 14.6 mg. was isolated being a total of 63.6 mg. for an overall yield of 52%.

17α-ethynyl-18-nor-13β-n-propyl-estradiol can be esterified in the 3-position by conventional methods with esterifying derivatives of any of the acids above enumerated to obtain the ester of an organic carboxylic acid having from 1 to 18 carbon atoms. The hydroxyl group in the 3-position can be etherified by conventional methods with etherifying derivatives of alkanols having from 1 to 18 carbon atoms to obtain a 3-alkoxy ether, such as the 3-methoxy ether.

It is to be understood that the invention is not limited to the process of the examples given above and other expedients can be employed without departing from the spirit of the invention and the scope of the appended claims.

We claim:

1. 3-(tetrahydropyranyl-2')-oxy-13β-n-propyl-Δ$^{1,3,5(10)}$-gonatriene-17-one.

2. 3 - (tetrahydropyranyl - 2') - oxy-17α-ethynyl-13β-n-propyl-Δ$^{1,3,5(10)}$-gonatriene-17β-ol.

3. A process for the preparation of a compound having the formula

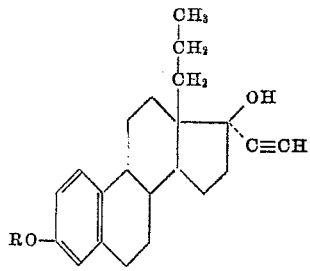

wherein R is selected from the group consisting of hydrogen, alkyl having 1 to 18 carbon atoms and an acyl radical of an organic carboxylic acid having 1 to 18 carbon atoms which comprises selectively oxidizing 18-nor-13β-n-propyl-estradiol with an aluminum alcoholate by the Oppenauer reaction to form 18-nor-13β-n-propyl-estrone, reacting the latter with dihydropyran under acidic conditions to form 3 - (tetrahydropyranyl - 2') - oxy - 13β-n-propyl-Δ$^{1,3,5(10)}$-gonatriene-17-one, reacting the latter with an ethynyl magnesium halide to form 3-(tetrahydropyranyl-2')-oxy-17α-ethynyl - 13β-n-propyl-Δ$^{1,3,5(10)}$-gonatriene-17β-ol, hydrolyzing the latter under acidic conditions to form 17α-ethnyl-18-nor-13βn-propyl-estradiol and recovering a compound of the above formula.

4. The process of claim 3 wherein the selective oxidation is effected with aluminum isopropylate in the presence of cyclohexanone.

5. The process of claim 3 wherein the ethynyl magnesium halide is ethynyl magnesium bromide.

6. The process of claim 3 wherein the hydrolysis is effected in the presence of p-toluene sulfonic acid in alcohol.

7. A process for the preparation of 17α-ethynyl-18-nor-13β-n-propyl-estradiol which comprises oxidizing 18-nor-13β-n-propyl-estradiol with aluminum isopropylate in cyclohexanone to form 18-nor-13β-n-propyl-estrone, reacting the latter with dihydropyran in the presence of phosphoric acid to form 3-(tetrahydropyranyl-2')-oxy-13β-n-propyl-Δ$^{1,3,5(10)}$-gonatriene-17-one, reacting the latter with ethynyl magnesium bromide to form 3-(tetrahydropyranyl - 2')-oxy-17α-ethynyl-13β-n-propyl - Δ$^{1,3,5(10)}$-gonatriene-17α-ol, hydrolyzing the latter with p-toluene sulfonic acid to form 17α-ethynyl-18-nor-13β-n-propyl-estradiol and recovering the latter.

References Cited in the file of this patent

UNITED STATES PATENTS 2,868,784     Ruzicka et al. _____ Jan. 13, 1959

OTHER REFERENCES

Fieser et al.: Steroids, page 476 (1959), Reinhold Pub. Co., New York, New York.